United States Patent [19]

Pepper, III

[11] Patent Number: 4,581,143
[45] Date of Patent: Apr. 8, 1986

[54] FIXED FILM PROCESS FOR THE TREATMENT OF WASTE WATER UTILIZING INTERFACIAL OXYGEN TRANSFER

[76] Inventor: Harry Pepper, III, 119 W. 8 St., Jacksonville, Fla. 32206

[21] Appl. No.: 637,542

[22] Filed: Aug. 3, 1984

[51] Int. Cl.$^4$ .............................................. C02F 3/06
[52] U.S. Cl. .................................. 210/614; 210/617; 210/630; 210/903
[58] Field of Search ............................... 210/614–618, 210/150, 620–622, 605, 630, 903

[56] References Cited

U.S. PATENT DOCUMENTS

| | | | |
|---|---|---|---|
| 3,933,629 | 1/1976 | Smith | 210/618 |
| 4,009,099 | 2/1977 | Jeris | 210/614 X |
| 4,076,616 | 2/1978 | Verde | 210/618 |
| 4,255,266 | 3/1981 | Moreaud et al. | 210/614 |
| 4,333,838 | 6/1982 | Ballnus | 210/614 |

FOREIGN PATENT DOCUMENTS 54-41269  2/1979  Japan .................................. 210/614

Primary Examiner—Thomas Wyse
Attorney, Agent, or Firm—John Cyril Malloy

[57] ABSTRACT

A process and apparatus for the treatment of waste water utilizing a downflow or upflow system incorporating a suitable media or biological growth wherein air is sparged into the media on an intermittent or pulsed flow basis at selected time intervals and the pulsed application of air allows the trapping of the air bubbles in the media bed based at least in part on particulate media size, shape and biofilm growth and thereby provides a more significant avenue of oxygen transfer due to a prolonged exposure of the air bubbles with the biomass and the absorption of oxygen directly from the film of the bubbles to the biofilm in addition to transfer from surrounding liquid due only to oxygen diffusion.

15 Claims, 7 Drawing Figures

FIXED FILM PROCESS FOR THE TREATMENT OF WASTE WATER UTILIZING INTERFACIAL OXYGEN TRANSFER

BACKGROUND OF THE INVENTION

1. Field of the Invention

This invention is directed towards a fixed film, pulsed air process for the treatment of waste water wherein oxygen transferred to the biomass is enhanced by direct contact of the biomass with bubbles entrapped and prolonged within a media bed.

2. Description of the Prior Art

In the treatment and purification of waste waters a number of processes exist which involve the growing of bacteria used to degrade the waste water components either in a suspended culture or on a fixed or movable media. The latter method is commonly known as a fixed film biological process and generally appears to have certain advantages over the commonly used suspended culture or activated sludge processes. One such distinct and well recognized advantage is the ability to develop a greater biomass concentration per unit volume and thereby to decrease the necessary reactor size for such treatment. This has the obvious advantages of reduced land area and capital cost requirements. Another important advantage is directed to the positive control of the biomass inventory which results in a more reliable treatment performance.

Prior to approximately 1970, most fixed film systems consisted of passing waste water over non-submerged rock or plastic media towers followed by a secondary clarification. The utilization of plastic media was looked upon as an improvement over the previously used rock media system since it had an increased surface area per unit volume and a greater void volume to facilitate air flow through the media and improve oxygen transfer to the liquid and therefore to the biomass growth on the media.

A system resulting in similar performance and cost features incorporates the rotation of a biological contactor where the media is attached to a shaft and rotated through waste waters. The waste waters are retained in tanks to insure contact with the biomass on the media. Aeration to the system occurs due to the fact that the rotating media is exposed to atmosphere approximately 60% of the time.

Prior art systems designed to incorporate submerged fixed film application were based on the requirement of using relatively small sized particulate media exhibiting high surface area characteristics in order to increase the fixed film biomass concentration per unit volume and thereby decrease the reactor size. Most of the prior art fixed film designs were upflow systems utilizing a variety of oxygen transfer methods. High rate biological oxygen demand requirement in the reactors of these systems were satisfied by presaturating the feed water with oxygen. Downflow systems are also recognized in the prior art wherein a packed bed fixed film system is utilized and waste water is fed to the top of the bed so that it flows downward through the packed bed media. The intended waste water treatment occurs by solid particle filtration and biological oxidation of soluble organic material by the biomass growing on the media. Specifically, a downflow fixed film biological media reactor has been introduced in France (biological aerated filter) wherein air is introduced into an intermediate location in the filter bed depth and the media depth below the air sparging point is utilized and is necessary for solids filtration.

While submerged fixed film systems are known to have reduced reactor size and capital cost requirement, typical continuous air sparging processes generally result in a greater energy requirement then previously used rock or plastic media towers. Such energy requirements in continuous flow sparged fixed film systems are dependent on the amount of oxygen that could be transferred to the liquid in the reactor from the sparging gas passing upward through the reactor.

The above set forth prior art processes and techniques base their oxygenation design on a fundamental oxygen transfer mechanism known in the prior art as the "two film" theory. Application of this theory, which was established in 1928, generally states that the oxygen is first transferred from a gas bubble into the bulk liquid and the biomass bacterial cells consumes the dissolved oxygen due to diffusion of dissolved oxygen from the liquid to the biofilm rather than from any direct engagement or contact with the gas bubble itself.

Accordingly, there is a recognized need in the prior art for a fixed film waste water treatment system having the advantages of a reduced reactor size and capital cost requirement while at the same time having minimal or at least reduced energy requirements to satisfy the oxygenation needs of the biofilm or system bio-mass.

SUMMARY OF THE INVENTION

The present invention relates to a process and apparatus for performing such process directed to the purification treatment of waste water. Generally, such treatment involves the application of a pulsed oxygenation, fixed film process incorporating a means of oxygen transfer to the biological cell of the biomass which may herein be termed "interfacial transfer." The submerged fixed film process is designed either as an upflow or downflow system.

More specifically, interfacial transfer involves oxygen transfer or absorption by the biomass based on a direct contact between the biofilm and surface of a gas or air bubble. This of course differs from the two film theory wherein the oxygen from the air is first dissolved into the surrounding liquid and then subsequently absorbed by the biomass directly from the liquid as versus from direct contact with the gas bubble itself. Therefore, interfacial transfer may be considered an additional pathway for oxygen transfer based on the recognition that a sparged gas bubble can be in contact with the fixed film biomass (biofilm) surface as well as the flowing liquid in the biological reactor. This additional oxygen transfer pathway, which is not described or encompassed by the two film theory, can account for a greater amount of oxygen transfer in a fixed film system than that described by the two film theory. Further, an important feature of the present invention is related to the action of sparged gas bubbles in a packed bed reactor. It has been found that based on the particular media size, media shape and biofilm growth, the sparged gas bubbles do not flow freely upward through the bed after exiting from the gas sparging device. Instead, bubbles can and do become trapped or prolonged in the void spaces of the media by the biological growth. Once the gas bubbles which are sparged into the system reach certain size, their buoyancy is sufficient to carry them to the top of the packed bed and out of the system. As the sparge rates increase, such as in a continuous flow sparging system, these gas bubbles are used less efficiently for direct oxygen transfer since their time in the packed bed reactor is decreased due to the more rapid formation of larger bubble sizes in the void spaces. The aforementioned inefficiency is thereby based on less time of the individual bubbles being spent in the media resulting in less time for interaction between the biological cells of the biomass and the film or surface of the bubbles themselves. Accordingly, by prolonging the time that the individual bubbles remain trapped within the voids of the media, contact is increased between the biomass and the bubbles and more oxygen is transferred per unit volume of sparged gas to reduce the quantity of sparged gas required to satisfy the oxytgen demand in a given biological reactor. This in turn reduces the energy required for biological treatment and reduces the disadvantage normally associated with continuous flow sparge systems. The sparge air contact and the contact time is increased in the process of the present invention by providing sparge gas air intermittently or at a selected pulsed rate to a fixed film system. The subject technique can also be applied to suspended growth activated sludge systems that use diffused air for oxygen transfer.

In practice, a downflow or upflow reactor containing a suitable media for biological growth preferably having a predetermined effective size of 1-6 mm and a depth of from 3-20 feet may be utilized. Any suitable media such as sand, anthracite, activated carbon, pumice, pea gravel or like material may be used as a suitable media. Air is provided by a distribution system located below or at the bottom of the fixed film media wherein the air percolates into the bed through a communication zone between the media and an underdrain.

Contrary to certain prior art systems, the air is not applied continuously. Instead, the air supply is provided intermittently or at a pulsed rate at selected intervals. The ratio of air on time to air off time may be equal but could also be varied dependent upon the particular application and/or waste water concentration, etc.

The media size selected and the biogrowth in the fixed film system results in trapping the air bubbles in the bed or more particularly in the voids between the media particles. If a continuous air application rate is used, the trapped bubbles are forced out of the bed to decrease the air bubble retention time. Thus, air is not used efficiently, and continuous air flow minimizes the contact time between the bubble and biological film. This reduction of contact time reduces the oxygen transfer and treatment efficiency.

In the pulsed or intermittent application of the sparged air, the gas bubbles stay in the bed longer and a greater quantity of oxygen per unit of air supplied. Increased contact between the biofilm and the gas volume applied is achieved. Thus, oxygen transfer is controlled less by the two film mechanism and more by the "interfactial transfer" pathway to reduce total air application rates. As set forth above, this results in lower energy requirements compared to the continuous air flow systems prevelant in the prior art.

During the interval when air is not applied to the media bed, more efficient filtration of solids occurs throughout the entire length of the media bed since agitation therein is minimized. During air application, solids filtration continues, but not as efficiently, due to contact between the biofilm and the solids. The overall result, however, is a filtration efficiency that is adequate for waste water treatment solids removal requirements.

The process and attendant apparatus of the present invention may also be operated in a manner to accomplish nitrification and denitrification. However, the accomplishment of such steps will likely require more reactor volume than used for only BOD (biological oxygen demand) removal in that nitrification requires more volume.

BRIEF DESCRIPTION OF THE DRAWINGS

For a fuller understanding of the nature of the present invention, reference should be had to the following detailed description taken in connection with the accompanying drawings in which.

Like reference characters refer to like parts throughout the several views of the drawings.

DETAILED DESCRIPTION OF THE PREFERRED EMBODIMENT

Figure 1:
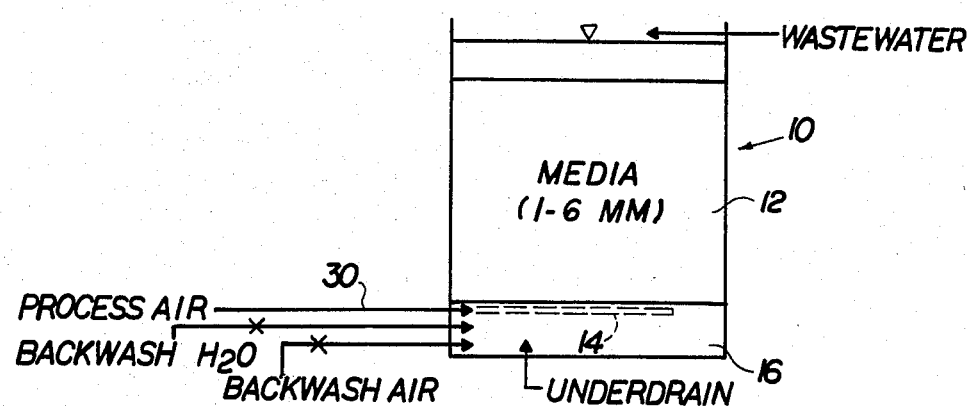
FIG. 1 is a schematic representation of a downflow reactor assembly incorporating apparatus capable of forming the process of the subject invention.
Figure 2:
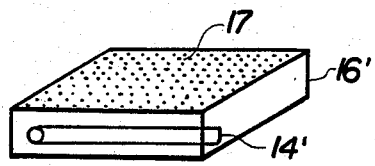
FIG. 2 is an isometric, partial schematic representation of a structure used to deliver air to the media of the reactor of FIG. 1.

With regard to FIG. 1, the present invention is directed towards a pulsed air, fixed film purification process for the treatment of waste waters. In the performance of the subject process, a downflow packed bed reactor generally indicated as 10 is utilized. An upflow packed bed can also be used. The medium 12 of the packed bed preferably has an effective size of 1-6 mm. and the media depth, in the preferred embodiment, may vary anywhere from 3-20 feet depending on the process design requirements. Further, design requirements relate to the media size and biological growth characteristics wherein such must be suitable to trap sparged gas bubbles within the void spaces of the media. Accordingly, suitable media material may be sand, anthracite, volcanic ash, pea gravel, activated carbon or other like material.

Sparged air is provided by a distribution header or chamber 14 placed at the bottom of or below the packed bed media 12. Distribution of the processed air may occur from header or chamber 14 from the top of the underdrain system 16 schematically represented in FIG. 1. Alternately, the header 14' may be mounted essentially within the underdrain system 16 wherein the underdrain system may comprise a clay, metal or synthetic tile or chamber 16' structured to include a plurality of distribution apertures 17 formed over an upper or exposed surface thereof. The air header may also be located directly on top of the underdrain system just below the media.

Figure 3:
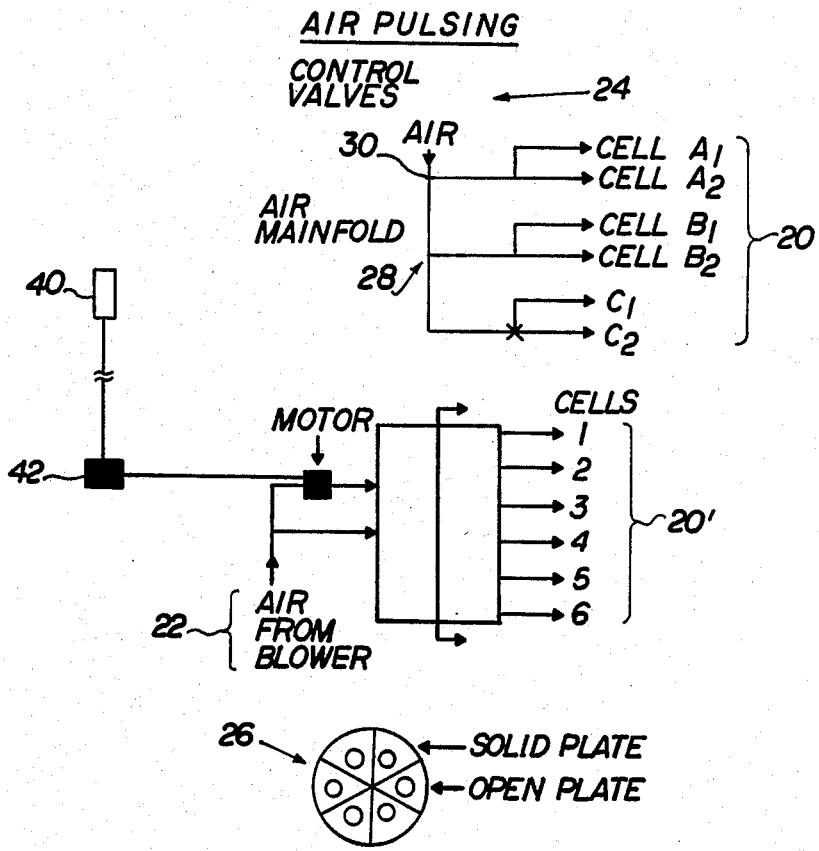
FIG. 3 is a schematic representation of an air supply system embodiment wherein such air is supplied to the media on a pulsed or intermittent basis at selected intervals.

In practice, the reactor 10 may incorporate use of multiple cells as schematically and collectively represented in FIG. 3 as 20 and 20', wherein common air blowers or compressors 22 operating continuously supplies the sparged air to a group of cells such as 20 and 20'. The air flow is stopped to one or more of the cells at any given time. For example, if two cells are utilized, the air flow rate from blower 22 is pulsed intermittently at various time intervals between the two cells. This results in air ON/OFF time intervals being a function of the system design factors including the BOD loading rate, the waste water BOD concentration, the air sparge rate, the media size, and the media depth.

Again with reference to FIG. 3, the ON/OFF sparge gas application to each cell 20 may be controlled by automatically operated valves 24 or alternately by a rotating mechanical device 26 that would open and close ports for an air manifold system generally indicated as 28 connected to the process air inlet line 30 (FIGS. 1 and 3) for each cell. The air ON/OFF period may typically vary from 10 to 30 seconds or to as much as 30 minutes or more, again depending on the particular application for which the subject process is intended. It should be further noted that the process is capable of nitrification and denitrification application, to be described in greater detail hereinafter, wherein during such application the difference between the ON/OFF time would be longer depending on the packed bed reactor detention time.

Figure 4:
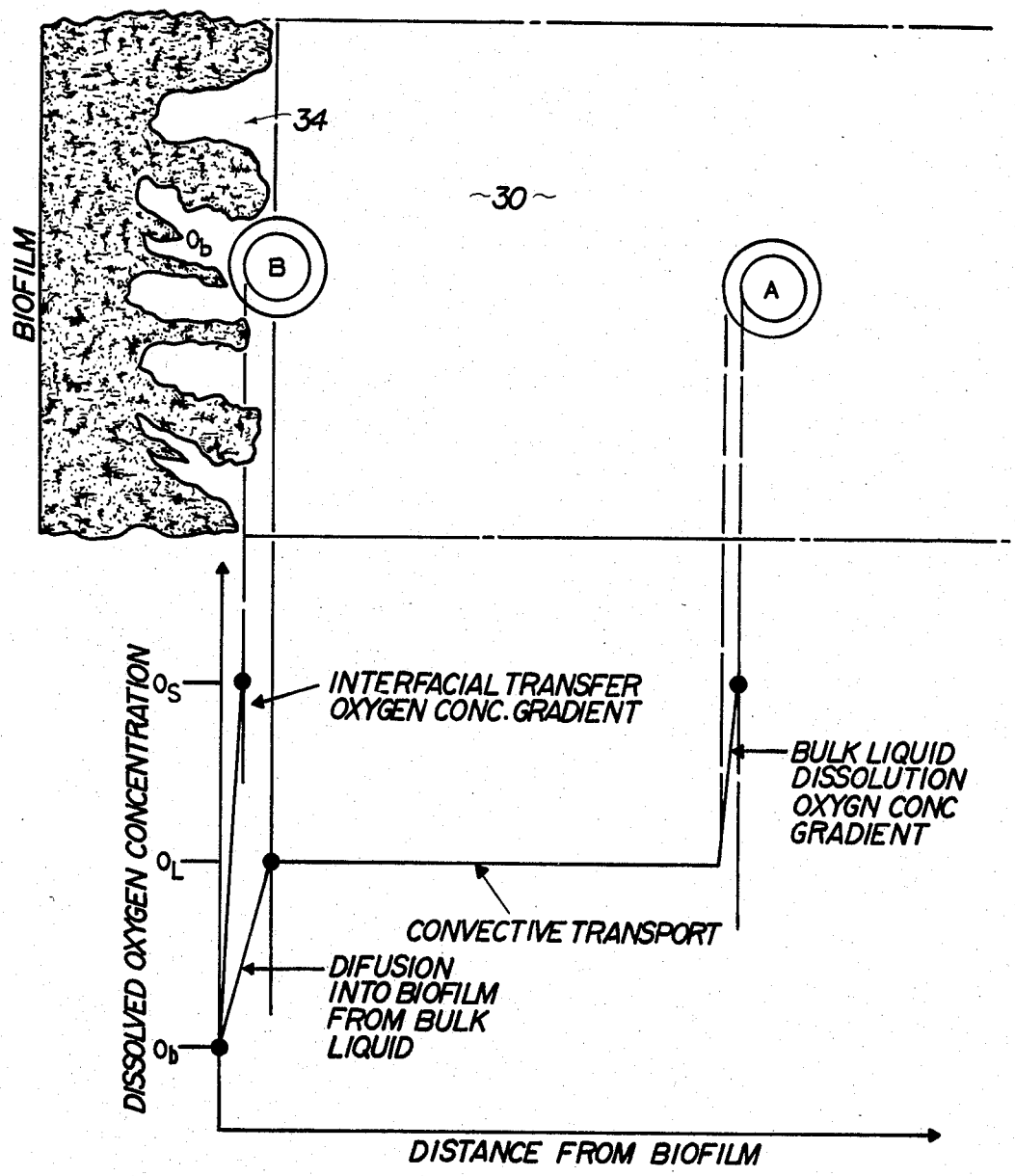
FIG. 4 is a schematic representation showing interaction between gas bubbles and a biomass in representation of the workings of the two film theory and interfacial transfer theory.

As best shown in FIG. 4 and as set forth above, the well-known "two film" theory is based on the fact that oxygen is first transferred from a gas bubble A into the surrounding liquid 30. For a fixed film system, it is acknowledged that the dissolved oxygen first diffuses across the stagnant film located between the biomass generally indicated as 34 and the flowing liquid 30. Once the oxygen diffuses across the film, it diffuses into the biomass bacterial cells comprising the biomass 34 for respiration and enzyme mediated oxidation-reduction reactions. Therefore, bubble A is shown in the flowing liquid 30 in a biological system and bubble B is in contact with the biofilm liquid film or biomass volume 34. Due to this contact, bubble B will be able to transfer oxygen to the biomass at a higher rate than bubble A even though both bubbles are identical in size, surface area, and oxygen partial pressure. Bubble A conforms to the two film theory resulting in an oxygen transfer rate as a function of the liquid dissolved oxygen concentration. Due to biological respiration, the dissolved oxygen concentration within the biofilm stagnant volume 34 is lower than in the liquid 30. Thus, the dissolved oxygen concentration dissolution driving force gradient for oxygen dissolution from bubble B is much greater than that from bubble A. Therefore, a high rate of oxygen transfer occurs due to this higher gradient of bubble B and also due to the shorter distance required for the diffusion of oxygen from bubble B to the biomass 34 compared to bubble A. As set forth above, this oxygen transfer pathway is herein termed "interfacial transfer" and can account for a greater amount of oxygen transfer in a fixed film system than that described by the two film theory.

Further with regard to the application of air at intermittent intervals, when sparge air is not applied to the packed bed during the OFF part of the ON/OFF interval, the gas bubbles trapped in the voids of the packed bed continue to transfer oxygen to the biomass via the interfacial transfer pathway. If the biological respiration rate is extremely great, the partial pressure of oxygen in the gas bubble contacting the biomass will be depleted rapidly. In this case, the difference between the ON/OFF intervals has to be decreased to shorten time intervals to replenish oxygen in the gas bubbles in the void spaces. For a less active biological system, the difference between the ON/OFF intervals would be of longer duration, and the air flow rate would also be lower.

Accordingly, the subject process reduces energy requirements for the sparged fixed film downflow packed bed reactor and results in efficient filtration of solids entering or produced in the bed in spite of air sparging throughout the bed depth. This is a result of the fact that the air is sparged intermittently and during the air OFF time, minimal agitation occurs in the packed bed. Small particles are more easily captured on the biofilm in the bed or adhered to the other particles trapped in the bed. The larger particles formed are more effectively trapped so that solids do not easily escape the packed bed during the air ON period which provides more agitation within the bed. The air ON period is short enough so that influent solids cannot reach the bottom of the packed bed via the liquid flow before the next air OFF period. Based on the above, a bottom filtration zone below the air header is not required. Therefore, the process and the accompanying structure for performing the subject process has the advantage of allowing the entire reactor depth to be made available for biological degradation of the waste water. An additional advantage is that a higher dissolved oxygen effluent is possible since oxygen is available throughout the entire media depth 12 (FIG. 1). As set forth above, the subject process incorporating the downflow packed bed system may also be designed and operated to accomplish denitrification of the waste water and thus nitrogen removal in addition to nitrification. During the air ON time and part of the OFF time, sufficient oxygen should be available to allow nitrifying bacteria attached to the biofilm to oxidize ammonia to nitrite and nitrate. During the OFF period, oxygen will be depleted within the depth of the biofilm attached to the media. Nitrite or nitrate produced will diffuse into this depth to provide an electronic acceptor to satisfy the oxygen demand within this biofilm depth. The nitrite or nitrate is then reduced to nitrogen gas products and recirculation of the effluent may be provided to enhance the efficiency of nitrification-denitrification performance.

Media modifications such as the use of dual media for a different embodiment of the preferred fixed film system is considered for the treatment of some waste waters. More specifically, a finer, more dense media may be used at the bottom of the media bed 12 to increase filtration efficiency. This could be a sand material wit anthracite above the lower portion. It could also be a garnet material located beneath the sand media.

Yet another embodiment of the present invention comprises the utilization, in the subject process, of a probe means 40 used in combination with a microprocessor 42 (FIG. 3) wherein the probe and microprocessor or similar controller are specifically structured to sense dissolved oxygen in the effluent from the media bed or at an intermediate point in the bed and automatically control the air sparge rate and attendant ON/OFF time intervals. The probe, microprocessor 40, 42 combination will observe the rate of increase of the dissolved oxygen concentration during sparging and/or rate of decrease during the OFF time. The air sparge rate and the ON/OFF time intervals will automatically be adjusted by the microprocessor as a function of the rate of change of the dissolved oxygen concentrations.

Figure 5:
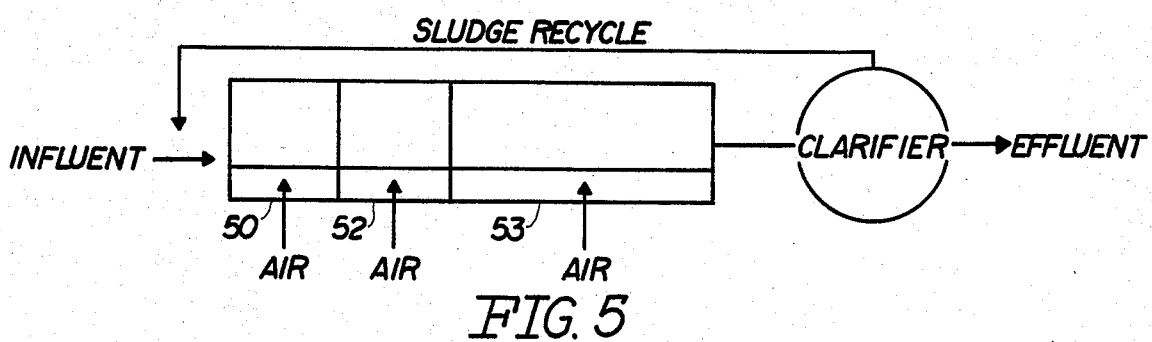
FIG. 5 is a schematic representation of the use of pulsed air in an activated sludge system.

With reference to FIG. 5, another embodiment of the present invention is the use of pulsed air in activated sludge systems. As in the packed bed system of FIG. 1, the activated sludge process may include a multi-stage system consisting of a number of treatment cells and include zone of high oxygen demand. This can be accomplished by a staged activated sludge system. The first two stages 50 and 52 are smaller than the final stage 53 to accomplish a high level of oxygen respiration per unit volume. This condition rapidly depletes the oxygen concentration in the activated sludge floc to greatly increase the oxygen transfer rate due to bubble contact with the floc. It should be noted that the pulsed air approach as set forth in the present invention can be used in a variety of activated sludge designs and configurations. It may also be used in systems where the mixing method is separate from the air sparge method. Diffused air activated sludge systems using short ON-/OFF intervals could benefit from this approach.

Figure 6:
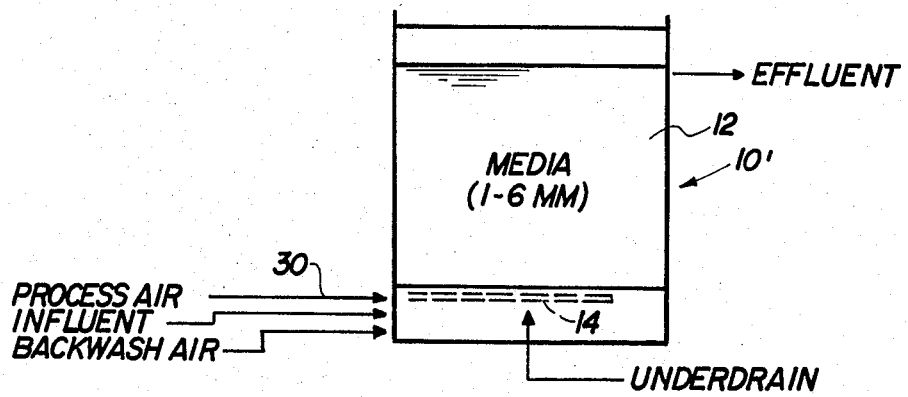
FIG. 6 is a schematic representation of an upflow reactor assembly incorporating apparatus capable of forming the process of the subject invention.
Figure 7:
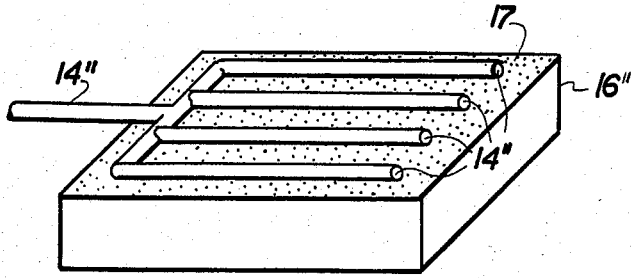
FIG. 7 is an isometric, partial schematic representation of another embodiment of a structure of the present invention used to deliver air from a point below the packed media bed of the reactor of either FIGS. 1 or 6.

It should be further emphasized that the pulsed air concept would be applicable to other types of biological systems to maximize oxygen utilization efficiency from sparge gases and minimize energy requirements normally associated with continuous flow sparge systems. An upflow packed bed reactor 10' (FIG. 6) would be operated in a similar fashion as discussed with regard to downflow packed bed reactor 10 (FIG. 1). In this embodiment, processed air is introduced below the media bed 12 and an influent similarly is introduced below the media bed wherein effluent is taken off as indicated from the reactor 10'. An underdrain may be of the type as represented with regard to the embodiment of FIG. 7.

Sparged air is provided by a distribution header for chamber 14 placed at the bottom of the media bed 12. Distribution of the processed air may occur by an alternate embodiment including delivery conduit 14" having the configuration represented in FIG. 7 and disposed on top of a synthetic tile or chamber 16' which may be structured to include a plurality of distribution apertures or other porous formation over an exposed surface thereof.

What is claimed is:

1. A fixed film process for the purification treatment of waste waters comprising the steps of:
    (a) supplying waste water influent to a packed media bed reactor,
    (b) sparging air intermittently into said packed media bed by subjecting media particles to alternate air on intervals and air off intervals and thereby subjecting biomass present within said packed media bed to direct contact with gas bubbles within said sparged air,
    (c) establishing aerobic conditions within the packed media bed during said air on intervals and subsequently maintaining said aerobic conditions within said packed media bed during said air off intervals by capturing said gas bubbles from the sparged air within the media particles,
    (d) prolonging exposure and direct contact of said gas bubbles with the biomass and thereby prolonging said aerobic conditions of said packed media bed during said air off intervals by regulating size and shape of said media particles and thereby at least partially the time of capture of said gas bubbles within said media particles,
    (e) accomplishing oxygen transfer between biological cells of the biomass and the gas bubbles by establishing and maintaining direct contact therebetween, and
    (f) further controlling the length of time of bubble capture within said media particles by controlling the length of time of said air off intervals and the time of beginning of said air on intervals following said air off intervals.

2. A process as in claim 1 further comprising regulating the time of said on/off intervals based on the sensing of dissolved oxygen within the biomass.

3. A process as in claim 1 further comprising regulating particle size of the media of the packed bed between 1 and 6 mm.

4. A process as in claim 3 further comprising establishing the depth of the packed media bed substantially between 3 feet and 20 feet.

5. A process as in claim 1 further comprising forming the packed media bed from a first media material disposed at the lower zone of the packed bed and also from at least a second or third media material located above the first media material wherein the first media material varies in size or density compared to the second media material and the packed bed is defined by a multi-media material.

6. A process as in claim 1 further comprising forming the packed media bed from a media material disposed at the lower zone of the packed bed and also from at least a second media material and a third media material located above the first media material; said second and said third media materials varying in size and density from one another and from said first media material.

7. A process as in claim 1 further comprising supplying the waste water influent to an upper zone of a downflow reactor and sparging air from a lower zone of the packed media bed so as to percolate the air up through the entire bed.

8. A process as in claim 7 further comprising distributing the sparged air substantially evenly throughout the packed bed from an area of distribution below the packed bed up through the entire packed media bed.

9. A process as in claim 1 further comprising sparging air at intermittent intervals to an upflow packed media bed at a predetermined location below the media near the waste water influent.

10. A process as in claim 1 further comprising supplying sparged air to said packed media bed automatically at intermittent intervals, wherein the time between sparged air application to the media bed is dependent on:
    (a) sensing dissolved oxygen within the biomass from the reactor, and
    (b) sparging air to the media based at least in part on change of the measured dissolved oxygen concentration within the reactor.

11. A process as in claim 10 further comprising accomplishing both nitrification and denitrification in the packed bed by increasing the reactor volume and increasing the on/off intervals in an on/off intermittent air sparging application to the media bed.

12. A process as in claim 11 further comprising utilizing a downflow reactor in the processing of said waste water influent and increasing denitrification efficency of said process by recirculating effluent from said reactor to an upper zone of the packed media bed.

13. A process as in claim 11 further comprising utilizing an upflow reactor in the processing of said waste water influent and increasing denitrification efficiency of said process by reciruclating effluent from said reactor throughout the packed media bed.

14. A process as in claim 10 further comprising sensing dissolved oxygen within the reactor at a substantially intermediate portion of the packed media bed.

15. A process as in claim 10 further comprising sensing dissolved oxygen within the effluent issuing from the reactor.

* * * * *